(12) United States Patent
Li

(10) Patent No.: US 7,843,452 B2
(45) Date of Patent: Nov. 30, 2010

(54) PROGRESSIVE REFINEMENT FOR TEXTURE-BASED VOLUME RENDERING

(75) Inventor: Wei Li, Princeton, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 667 days.

(21) Appl. No.: 11/755,256

(22) Filed: May 30, 2007

(65) Prior Publication Data
US 2008/0094397 A1   Apr. 24, 2008

Related U.S. Application Data

(60) Provisional application No. 60/853,966, filed on Oct. 24, 2006.

(51) Int. Cl.
*G06T 17/00* (2006.01)
(52) U.S. Cl. ...................................... 345/424
(58) Field of Classification Search .................. None
See application file for complete search history.

(56) References Cited

U.S. PATENT DOCUMENTS

| | | | | |
|---|---|---|---|---|
| 5,831,623 A | * | 11/1998 | Negishi et al. | 345/424 |
| 6,160,907 A | * | 12/2000 | Robotham et al. | 382/154 |
| 6,268,865 B1 | * | 7/2001 | Daniels et al. | 345/582 |
| 6,389,104 B1 | * | 5/2002 | Bani-Hashemi et al. | 378/98.12 |
| 6,876,360 B2 | * | 4/2005 | Sasaki | 345/422 |
| 2005/0138569 A1 | * | 6/2005 | Baxter et al. | 715/788 |

OTHER PUBLICATIONS

Snavely, N., Seitz, S., Szeliski, R., Photo Tourism: Exploring Photo Collections in 3D, Jul. 2006, ACM Transactions on Graphics, vol. 25, Issue 3, pp. 835-846.*

* cited by examiner

*Primary Examiner*—Said Broome
(74) *Attorney, Agent, or Firm*—Donald B. Paschburg

(57) ABSTRACT

A method for rendering a two-dimensional image comprising: (a) obtaining a first three-dimensional set of data for a relatively high quality image; (b) generating a second three-dimensional set of data for a relatively low quality image from the obtained three-dimensional set of data; (c) rendering a relatively low quality two-dimensional image from second three-dimensional set of data; (d) rendering a first portion of a relatively high quality two-dimensional image from a first portion of the first three-dimensional set of data; (e) blending the rendered low quality two-dimensional image with relatively high quality two-dimensional image; (f) rendering a second portion of a relatively high quality two-dimensional image from a different portion of the first three-dimensional set of data; and (g) blending the rendered low quality two-dimensional image from second three-dimensional set of data with relatively high quality two-dimensional image from the second portion of the first three-dimensional set of data. The process repeats until the entire image is rendered.

5 Claims, 4 Drawing Sheets

PROGRESSIVE REFINEMENT FOR TEXTURE-BASED VOLUME RENDERING

CROSS-REFERENCE TO RELATED APPLICATIONS

This application claims priority to U.S. Provisional Application No. 60/853,966 which was filed on Oct. 24, 2006, and which is fully incorporated herein by reference.

TECHNICAL FIELD

This invention relates generally to imaging and more particularly to rendering two-dimensional (2D) images from three-dimensional (3D) sets of data (i.e., voxels).

BACKGROUND AND SUMMARY

As is known in the art, volume rendering is a method which projects an image provided by three-dimensional volumetric data on a two-dimensional plane. Volume rendering is an important technique for visualizing and analyzing three-dimensional data. It is widely used in for instance medical applications for visualizing data that have been obtained by for instance MRI and CT methods.

As is also known in the art, texture-based volume rendering is typically a lengthy process. If necessary, the rendering is done at lower quality level during user interaction, and then a higher quality rendering is performed to generate the final image once the interaction is stopped. When rendering a high resolution image of a large dataset, the waiting time for the final image could be quite long. Therefore, it is more user friendly to display partially rendered final image so that user can observe the progress of refinement. The user has more information to decide whether the current viewing parameters are good enough for his/her purpose, and he/she may stop the rendering and start interaction again.

In texture-based volume rendering, however, the rendering is done in brick level. A brick contains a sub-volume of the dataset. For example, reference is made to a simplified example in FIG. 1. Here a 3D volume of voxels is shown having four bricks A, B, C and D. Each brick here for simplicity has 196 voxels. FIGS. 2a-2d shown the step by step 2D rendering using the 3D voxel set in the first brick A, then the 2D rendering using the 3D voxel set in the second brick B, then the 2D rendering using the 3D voxel set in the third brick D; and finally the 2D rendering using the 3D voxel set in the first brick D in FIGS. 2a, 2b, 2c and 2d, respectively. Applying the rending brick-by-brick allows the renderer to skip invisible bricks to gain acceleration. More importantly, partition of a large dataset into bricks enables the rendering of dataset larger than the graphics memory. To display the intermediate image with some visible bricks not rendered, however, may give the user false illusion of the structure of the dataset, hence is not advisable, particularly for medical applications.

In accordance with the present invention, a method is provided for rendering a two-dimensional image. The method includes: (a) obtaining a first three-dimensional set of data for a relatively high quality image; (b) generating a second three-dimensional set of data for a relatively low quality image from the obtained three-dimensional set of data; (c) rendering a relatively low quality two-dimensional image from second three-dimensional set of data; (d) rendering a first portion of a relatively high quality two-dimensional image from a first portion of the first three-dimensional set of data; (e) blending the rendered low quality two-dimensional image from second three-dimensional set of data with relatively high quality two-dimensional image from the first portion of the first three-dimensional set of data; (f) rendering a second portion of a relatively high quality two-dimensional image from a different portion of the first three-dimensional set of data; and (g) blending the rendered low quality two-dimensional image from second three-dimensional set of data with relatively high quality two-dimensional image from the second portion of the first three-dimensional set of data. The process returns to (f) until the entire image is rendered into two dimensions.

With such method, a progressive refinement approach is provided that is suitable for brick-by-brick texture-based rendering. The method presents a sequence of blending between a low quality image and the final high quality image and then to display a smooth transition from low quality to high quality images and hide the boundary of the bricks. The blending is a function of the current percentage of completeness of the final image, the pixel completeness, and the difference in color of the same pixels in the different images.

With such method, texture-based volume rendering is achieved using a progressive refinement approach. The method blends low-quality and partially completed high-quality images. The blending function considers various pixel properties, such as image completeness, pixel completeness, and color difference. It ensures smooth transition of pixel colors as well as hides the blocky effects which is inherent in the partially rendered images with the brick-by-brick rendering order.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 3:
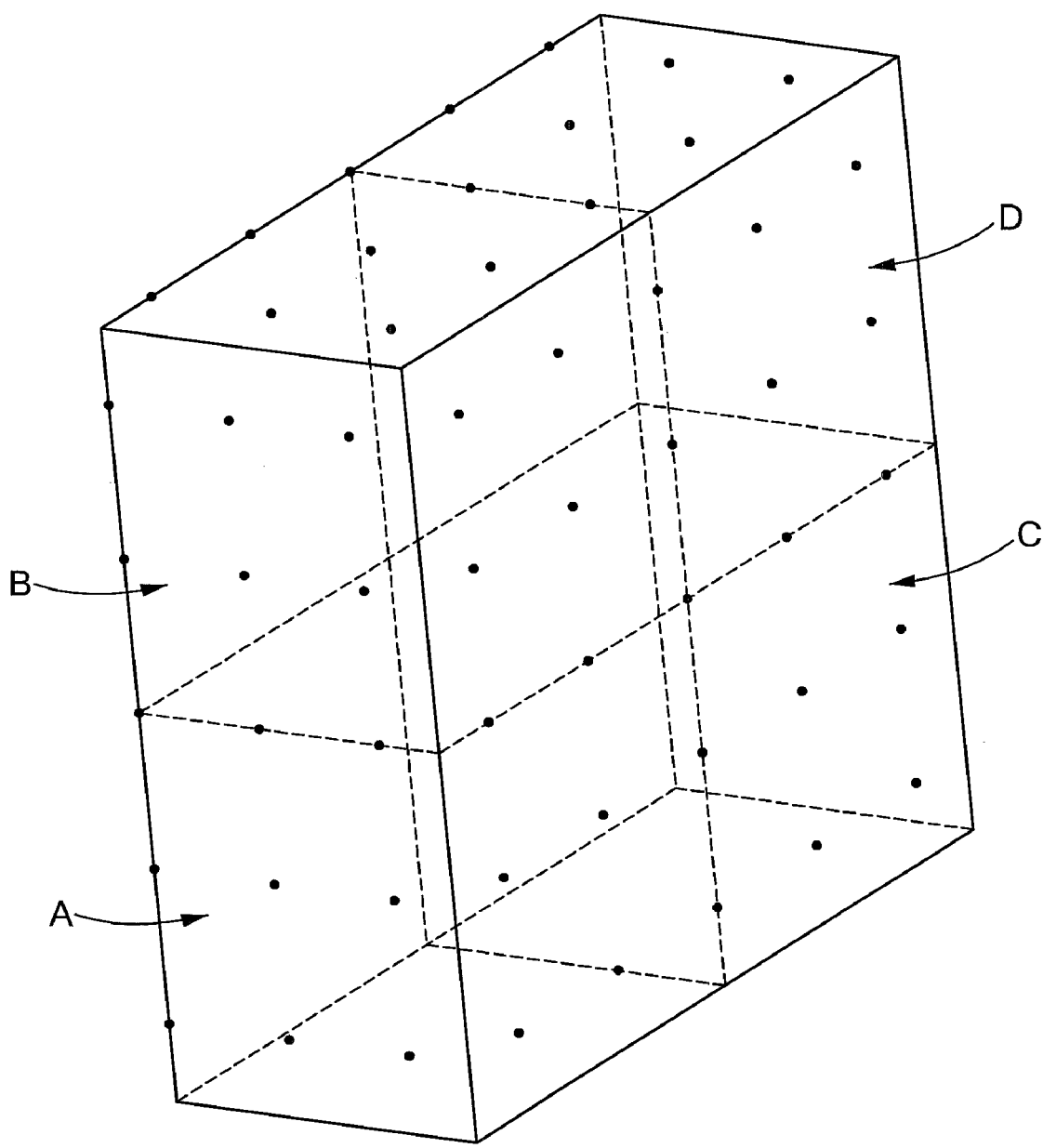
FIG. 3 shows the 3D volume of voxels having the four bricks A, B, C and D with fewer voxels than shown in FIG. 1.
Figure 4:
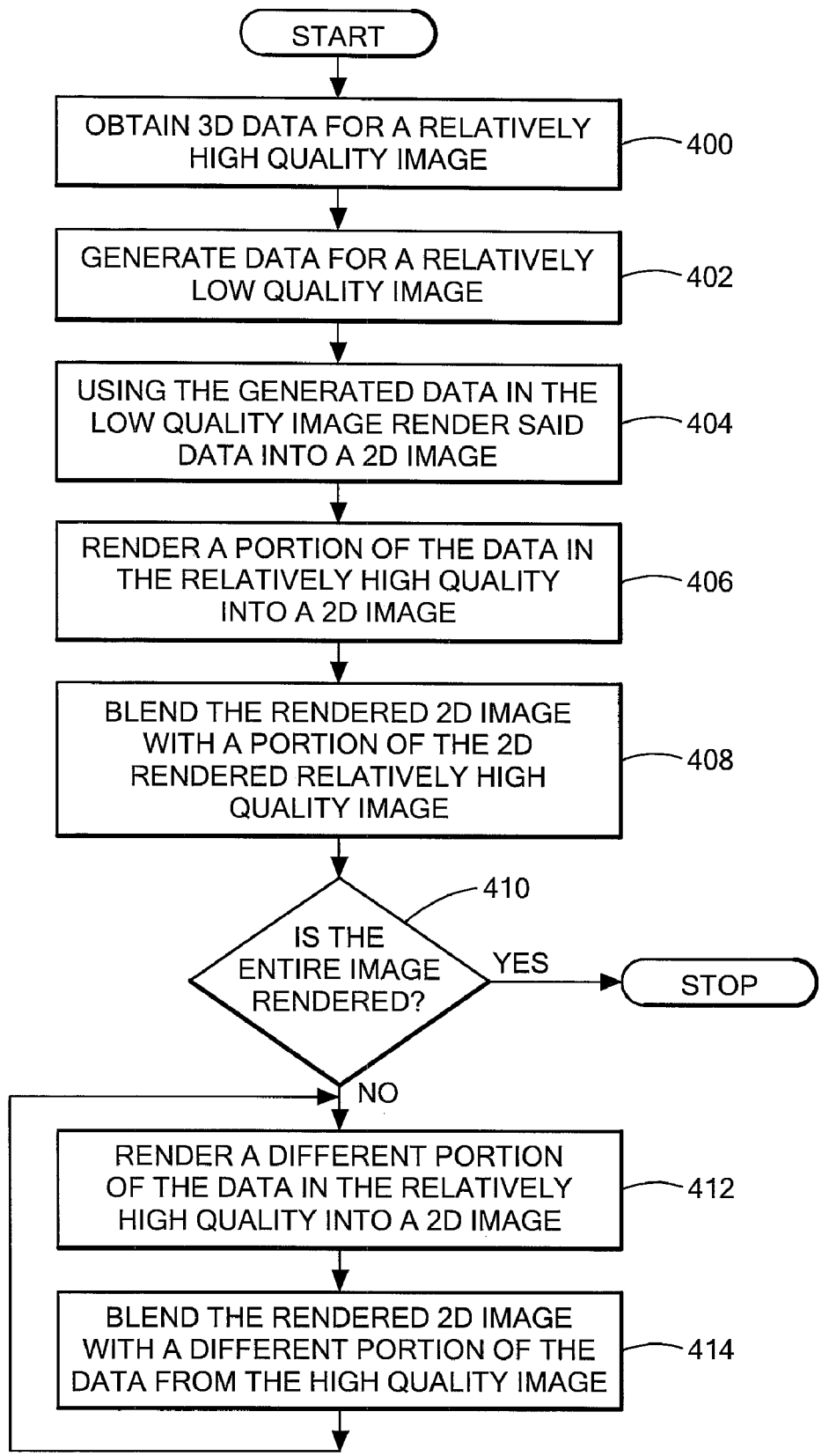
FIG. 4 is a flow chart of the method according to the invention.

Referring to FIG. 4 a flow chart of the process is shown. In Step 400, a first three-dimensional set of data (FIG. 1) for a relatively high quality image is obtained from any conventional source, such as MRI and CT equipment, not shown. The process next generating a second three-dimensional set of data (FIG. 3) for a relatively low quality image from the obtained three-dimensional set of data Step 402. For example the process down-samples or reduces the number of voxels in the 3D data set, as indicated in comparing the number of voxels, (represented as dots) in FIG. 1 with the reduced number of voxels in FIG. 3. Alternatively, the lower quality image can be generated by rendering into a smaller image; i.e., rendering a smaller view port.

Next, the process renders a relatively low quality two-dimensional image from second three-dimensional set of data, Step 404. Next, the process renders a first portion of a relatively high quality two-dimensional image from a first portion (e.g. brick A in FIG. 1) of the first three-dimensional set of data, Step 406. Next, the process blends the rendered low quality two-dimensional image from second three-dimensional set of data (i.e., the old image) with relatively high quality two-dimensional image from the first portion (Brick A) of the first three-dimensional set of data (i.e., the new image), Step 408. Next, the process determines whether the entire image has been rendered, Step 410. If not, the process renders a second portion of a relatively high quality two-dimensional image (e.g., brick B, FIG. 1) from a different portion of the first three-dimensional set of data, Step 412. Next, the process blends the rendered low quality two-dimensional image from second three-dimensional set of data (i.e., the old image) with relatively high quality two-dimensional image from the second portion of the first three-dimensional set of data (the new image), Step 414 and the process returns to Step 410 until the entire image has been rendered.

Figure 1:
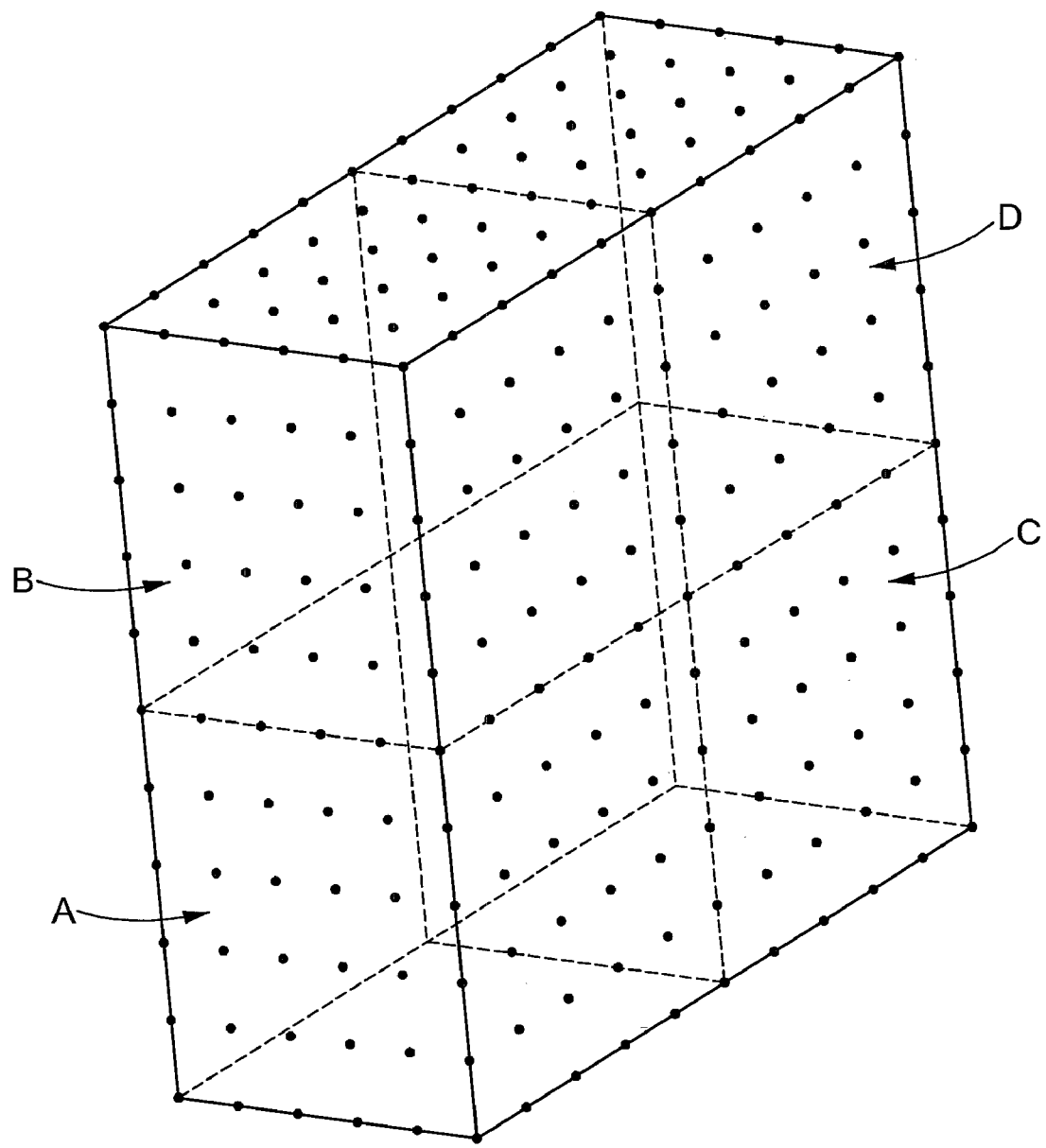
FIG. 1 shows a 3D volume of voxels having four bricks A, B, C and D.
Figure 2A:
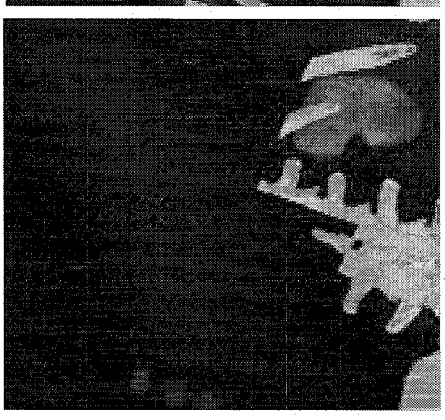
FIGS. 2a-2d shows the step by step 2D rendering using the 3D voxel set in the first brick A, then the 2D rendering using the 3D voxel set in the second brick B, then the 2D rendering using the 3D voxel set in the third brick D; and finally the 2D rendering using the 3D voxel set in the first brick D in FIGS. 2a, 2b, 2c and 2d, respectively.
Figure 2B:
Figure 2C:
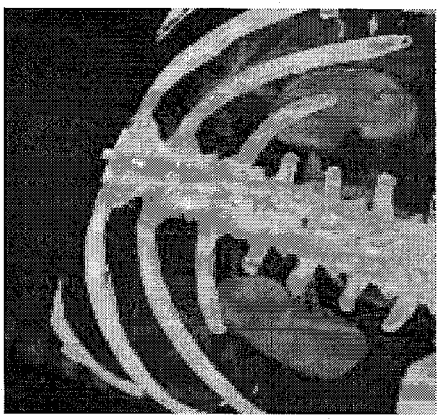
Figure 2D:
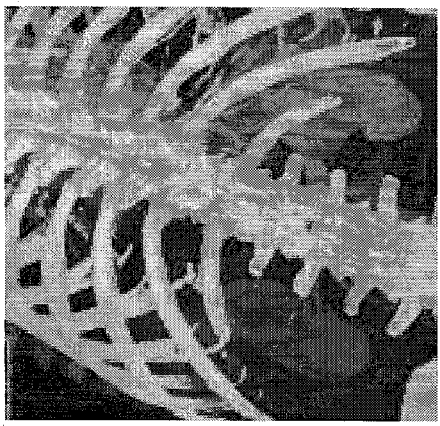
Figure 3A:
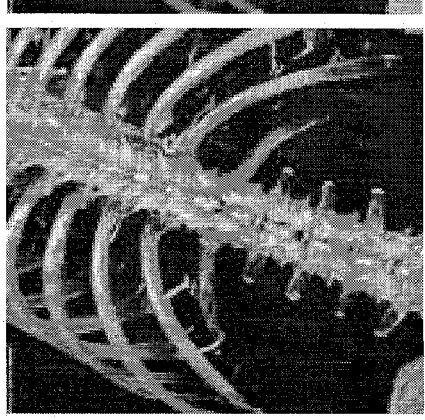
FIGS. 3a-3d shown the step by step 2D rendering according to the invention by rendering a relatively low quality two-dimensional image from three-dimensional set of data of FIG. 3, rendering a first portion of a relatively high quality two-dimensional image from brick A of FIG. 1 and then blending the rendered low quality two-dimensional image from FIG. 3 with the relatively high quality two-dimensional image, such blended 2D rendered image being shown in FIG. 3a and then repeating the process for bricks B, C, and D and FIG. 2 to render entire image into two dimensions as shown in FIGS. 3b-3d according to the invention.
Figure 3B:
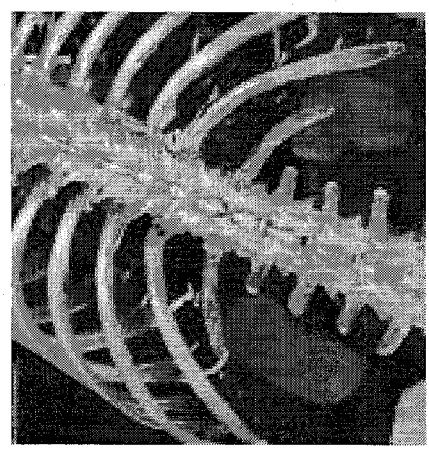
Figure 3C:
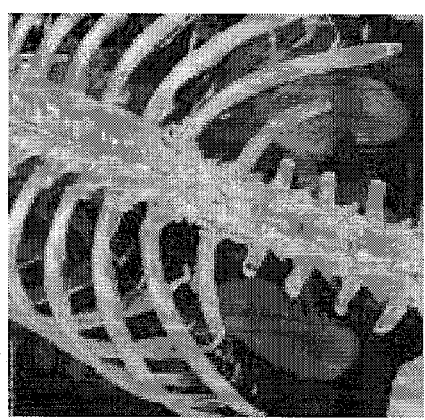
Figure 3D:
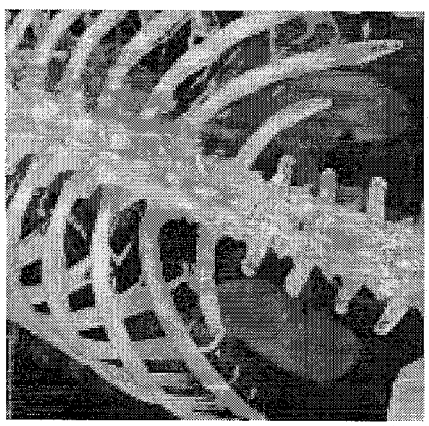

FIGS. 3a-3d shown the step by step 2D rendering according to the invention by rendering a relatively low quality two-dimensional image from three-dimensional set of data of FIG. 3, rendering a first or portion of a relatively high quality two-dimensional image from brick A of FIG. 1 and then blending the rendered low quality two-dimensional image from FIG. 3 with the relatively high quality two-dimensional image, such blended 2D rendered image being shown in FIG. 3a and then repeating the process for bricks B. C, and D and FIG. 2 to render entire image into two dimensions as shown in FIGS. 3b-3d according to the invention. It should be noted that for illustration purpose, the difference between the low-quality and high-quality image have been enlarged so that the transition is more visible. In practice, we use many more images with small delta differences so that the transition between neighboring images is smooth. Obviously, the blending approach is more favorable than directly displaying the partially rendered images. Also in the blended sequence, the block effects are not noticeable.

Thus, as noted in progressing from FIG. 3a to FIG. 3d, the process gradually blends the low-quality image with the high-quality image.

The sequence (FIGS. 3a through 3d) displays the refinement as smooth as possible and hides the blocky effects due to the brick-by-brick rendering order in texture-based volume rendering.

In the following discussion, and as noted above, the old image refers to the current image being displayed, which is first initialized to be the low quality image. The new image is the partially completed high quality image, which is updated gradually by the renderer, and finally becomes the completed high quality image. The blending function should consider the following factors.

Percentage of Completeness of the High Quality Image

Intuitively, the more the final image is completed, the more weight it should have in the blending. An example function considering this factor is (old color)*(1−completeness)+(new color)*completeness where
completeness is in the range of [0, 1]. In our implementation, the completeness is computed as the ratio of (bricks rendered)/(total bricks). It can also be computed in other ways, such as (voxels rendered)/(total voxels). But in general, it should approximate the completeness of the whole final image.

Pixel Completeness

Pixels in the intermediate images may have accumulated its color and opacity partially, if they are rendered from multiple bricks overlapped along the viewing direction. Naturally, only the fully completed pixels should be blended. In our implementation, we use the pixel opacity to estimate whether a pixel in the intermediate image is fully rendered. Because, we assume the opacity difference between the same pixels in low-quality and high-quality image is small enough. Or at least it is true for most of the pixels. The opacity of a pixel is increased monotonically during rendering. It is not accurate but is good enough for the purpose. Here is an example formula:

if (alpha of new color)>0.9*(alpha of old color);where alpha is the opacity of the pixel;

the pixel is completed other wise
the pixel is NOT completed

Gradient of Pixel Completeness

As shown in FIGS. 2A-2D, intermediate images of volume rendered in brick-by-brick order exhibits strong blocky effects, which is undesirable. Assuming we have a pixel completeness image, and a pixel value of 1 means the pixel is completed, while a value of 0 means not. Areas with large difference between neighboring pixels in the completeness image, which we refer to as the gradient, correspond to the brick edges. To further hide the brick edges, we apply low-pass filtering to the pixel completeness image. The filtered completeness image then contains continuous values between 0 and 1. Using these values as completeness instead of the binary ones blurs the brick boundaries.

Color Difference

It is possible there exists significant color difference between the pixel pairs in the low-quality and high-quality image. To ensure smooth transition, we should not allow a pixel color to change abruptly during the blending. Therefore, we designed the following recursive equation to gradually update the old image blended color=(old color)+(change ratio)*((new color)−(old color))

where change ratio is a number from 0 to 1 and represents a desired rate of change from image to image, where 1 is for the most abrupt change and 0 is for the smoothest change. The blended image is then treated as the old image in the next blending step. Obviously, using this formula, the image displayed may not be identical to the final image when the rendering is completed. Therefore, we need one or more additional blending steps to reach the final image. A smaller blend factor makes the color transition smoother, but it also requests more additional final blending steps.

Put it all together, we have designed the following blending function blended color=old color+(image completeness)*(pixel completeness)*(change ratio)*(new color−old color)

The above factors are considered in our example implementation. Practical usage of this approach is certainly not limited to the mentioned factors. Other factors may be considered so long as they help achieve a smooth color transition and hide the brick boundaries. Considering performance and specialties of dataset and transfer function, one could also use just a subset of the described factors. For example, it has been found that in many cases, just use the binary version of pixel completeness achieves good results, that is, we could ignore the gradient of pixel completeness.

CONCLUSION

The process according to the invention provides a progressive refinement approach for texture-based volume rendering. It blends low-quality and partially completed high-quality images. The blending ensures smooth transition of pixel colors as well as hide the blocky effects which is inherent to the brick-by-brick rendering order.

A number of embodiments of the invention have been described. Nevertheless, it will be understood that various modifications may be made without departing from the spirit and scope of the invention. Accordingly, other embodiments are within the scope of the following claims.

What is claimed is:

1. A method for rendering a two-dimensional image, comprising:
   (a) obtaining a first three-dimensional set of data from an imaging apparatus for a first quality image;
   (b) generating a second three-dimensional set of data for a second quality image from the obtained three-dimensional set of data, the second quality image being lower than the first quality image;
   (c) rendering a third quality two-dimensional image from the second three-dimensional set of data;
   (d) rendering a fourth quality two-dimensional image from a first portion of the first three-dimensional set of data, the rendered fourth quality image being a higher quality than the third quality;
   (e) blending the rendered third quality two-dimensional image from a second three-dimensional set of data with the fourth quality two-dimensional image from the first portion of the first three-dimensional set of data;
   (f) rendering a fifth quality two-dimensional image from a different portion from the first portion of the first three-dimensional set of data, the fifth quality image being of the same quality of the fourth quality image;
   (g) blending the rendered third quality two-dimensional image from second three-dimensional set of data with the fifth quality two-dimensional image from the second portion of the first three-dimensional set of data; and
   wherein the third quality two-dimensional image from the second three-dimensional set of data in (c) is an old image and the fourth quality two-dimensional image from the first portion of the first three-dimensional set of data in (d) is a new image, and wherein the blending of the old image with the new image is in accordance with: pixel color in blended image=pixel color in old image+(image completeness)*(pixel completeness)*(change ratio)*(pixel color in new image−pixel color in old image), where:
   image completeness is a ratio in the range of 0 to 1;
   pixel completeness is in accordance with: if (alpha of new color)>0.9*(alpha of old color) the pixel is completed, wherein completeness=1; otherwise the pixel is not completed and completeness=0;
   where alpha is the opacity of the pixel; and
   change ratio is a number from 0 to 1 and represents a desired rate of change from image to image, where 1 is for the most abrupt change and 0 is for the smoothest change.

2. The method recited in claim 1 wherein the blended image in (e) is then treated as an old image for the blending in (g).

3. The method recited in claim 1 wherein: image completeness is computed as the ratio of number of bricks in the image that are rendered/total number of bricks in the image to be rendered, wherein each brick is a plurality of voxels.

4. The method recited in claim 1 wherein: image completeness is computed such as the ratio of the number of voxels in the image rendered/total number of voxels in the image to be rendered.

5. The method recited in claim 1 wherein the method is iteratively performed until a final image is rendered and wherein completeness is computed as percentage of the final image actually rendered.

* * * * *